United States Patent [19]

Usui

[11] Patent Number: 5,620,666
[45] Date of Patent: Apr. 15, 1997

[54] EXHAUST GAS CLEANING METALLIC SUBSTRATE

[75] Inventor: Masayoshi Usui, Shizuoka-ken, Japan

[73] Assignee: Usui Kokusai Sangyo Kabushiki Kaisha, Ltd., Shizuoka-ken, Japan

[21] Appl. No.: 500,562

[22] Filed: Jul. 11, 1995

[30] Foreign Application Priority Data

Jul. 11, 1994 [JP] Japan .................................. 6-180495

[51] Int. Cl.$^6$ .................................................. B01D 50/00
[52] U.S. Cl. ........................ 422/171; 428/177; 428/179; 428/180; 428/181; 428/190; 60/301; 29/890.08
[58] Field of Search ................................. 422/171, 177, 422/178, 179, 180, 181, 221, 190, 193, 211; 502/527, 439; 29/890, 890.08; 60/299, 301; 428/678, 610, 653; 148/127

[56] References Cited

U.S. PATENT DOCUMENTS

| | | | |
|---|---|---|---|
| 4,948,774 | 8/1990 | Usui et al. | 502/439 |
| 4,988,483 | 1/1991 | Usui et al. | 422/180 |
| 5,049,206 | 9/1991 | Usui et al. | 148/127 |
| 5,104,627 | 4/1992 | Usui et al. | 422/171 |
| 5,110,690 | 5/1992 | Usui et al. | 428/678 |
| 5,346,675 | 9/1994 | Usui et al. | 422/180 |
| 5,492,376 | 2/1996 | Usui et al. | 285/382 |

FOREIGN PATENT DOCUMENTS

| | | |
|---|---|---|
| 62-273050 | 11/1987 | Japan . |
| 62-273051 | 11/1987 | Japan . |
| 1-218637 | 8/1989 | Japan . |
| 3-502660 | 6/1991 | Japan . |
| 4-227855 | 8/1992 | Japan . |

Primary Examiner—Christopher Kim
Attorney, Agent, or Firm—Lowe, Price, LeBlanc & Becker

[57] ABSTRACT

Described is an exhaust gas cleaning metallic substrate of the structure that three metallic honeycomb bodies are successively arranged within a metallic casing. Among the three metallic honeycomb bodies, (i) the metallic honeycomb bodies at front and rear positions have each been constructed by fixing a planar and corrugated bands as constituent members of said metallic honeycomb body at at least some of points of contact therebetween and also an outer peripheral wall of the metallic honeycomb body and an inner peripheral wall of the metallic casing at at least some of points of contact therebetween, and (ii) the metallic honeycomb body at a middle position has been constructed without fixing a planar and corrugated bands as constituent members of said metallic honeycomb body at points of contact therebetween and also an outer peripheral wall of the metallic honeycomb body and an inner peripheral wall of the metallic casing at points of contact therebetween.

11 Claims, 7 Drawing Sheets

EXHAUST GAS CLEANING METALLIC SUBSTRATE

BACKGROUND OF THE INVENTION a) Field of the Invention

This invention relates to a metallic substrate for supporting thereon an exhaust gas cleaning catalyst which is inserted in an exhaust system of an automotive vehicle as cleaning means for exhaust gas from the automotive vehicle.

In particular, the present invention is concerned with a honeycomb body which is a principal element of the metallic substrate, has a honeycomb structure formed of a planar band and a corrugated band made of metal sheets and is employed to support an exhaust gas cleaning catalyst. Notably, the present invention adopts a novel fixing method for the components of the honeycomb body and also for the honeycomb body in the metal-made casing, so that an exhaust gas cleaning metallic substrate excellent in both durability and economy can be provided.

b) Description of the Related Art

Metal-made substrates (hereinafter called the "metallic substrates) for supporting thereon exhaust gas cleaning catalysts of the above-mentioned type (for example, catalyst systems making use of Pt, Rh, Pd and the like) have been mounted on automotive vehicles and the like and have entered the stage of commercial use for their excellent properties compared with conventional ceramic substrates such as cordierite substrates.

In the present field of art, the metal substrates are also called metal supports and may be abbreviated as "MS". In the present invention, this abbreviation will also be used.

The above-described metallic substrates (MS) are each composed of:

(1) a honeycomb body of a honeycomb structure (hereinafter called the "metallic honeycomb body") formed by bringing a planar band and a corrugated band, which are made of heat-resistant metal sheets and have a predetermined width, into a stacked contiguous relationship in view of such desires as supporting a cleaning catalyst in a greater amount per unit volume (in other words, increasing as much as possible the area of effective contact between exhaust gas and the cleaning catalyst per unit volume), reducing the back pressure (the resistance to the discharge of exhaust gas) and further reducing the own weight of the metallic substrate as much as possible; and (2) a metal-made casing for enclosing and fixedly holding the metallic honeycomb body therein (hereinafter called the "metallic casing").

An abbreviation (H) is used for the metallic honeycomb body because of its honeycomb structure, while an abbreviation (C) is employed for the metallic casing after the word "casing".

The metallic honeycomb body (H) as a principal element of the above-described metallic substrate (MS) is formed, for example, by bringing a planar band, which is made of a heat-resistant steel sheet of 100 μm or less (preferably 50 μm or less) in thickness, and a corrugated band, which has been obtained by forming a similar steel sheet into a corrugated form, into a stacked contiguous relationship and then rolling them together into a spiral form so that a honeycomb body of a honeycomb structure having a number of network-patterned gas flow passages in an axial direction is obtained.

In the present field of art, a variety of metallic honeycomb bodies (H) are known other than the above-described rolled type, depending on the method for fabricating a metallic honeycomb body (H) from a planar band and a corrugated band. For example, are known those of the stacked type, which are each obtained by stacking both the types of bands in layers. Besides, metallic honeycomb bodies of the radial type, S-shaped type, the type that three huge commas are so united as to make a perfect circle, the X-wrapped (swastika-patterned) type or the like are known from Japanese Patent Application Laid-Open (Kokai) No. SHO 62-273050, Japanese Patent Application Laid-Open (Kokai) No. SHO 62-273051, Japanese Patent Application Laid-Open (Kokai) No. HEI 1-218637, Japanese Language Laid-Open Publication (PCT) No. HEI 3-502660, Japanese Patent Application Laid-Open (Kokai) No. HEI 4-227855 or the like.

A typical conventional metallic substrate is illustrated in FIG. 13. Namely, the conventional metallic substrate indicated by MS' is of the construction that a single metallic honeycomb body H' a principal element, is arranged within a metallic casing C.

To distinguish the conventional metallic substrate MS' and metallic honeycomb body H' from those of the present invention, their abbreviations are accompanied by a prime.

Since the metallic substrate MS' is employed in severe thermal environment, that is, an exhaust gas system, the metallic honeycomb body H' and the metallic casing C are firmly fixed together. This is necessary because the metallic honeycomb body H' and the metallic casing C are heated to high temperatures by heat conducted from hot exhaust gas itself and also by exothermic reactions of exhaust gas induced by a cleaning catalyst and in such a high-temperature atmosphere, the large thermal stress is applied to individual elements, in other words, because they have to withstand such thermal stress. They also have to vibrations and the like during running of an automotive vehicle. In general, they are firmly fixed together by brazing or the like.

On the other hand, the planar band and the corrugated band, which make up the metallic honeycomb body H', are fixed together by one of various methods at points or areas of contact therebetween (for example, at some and predetermined ones of such points or areas of contact inside the honeycomb body).

However, the metallic substrate MS' composed of the conventional metallic honeycomb body H' and metallic casing C' cannot withstand use over a long term. Due to thermal stress produced in the above-described high-temperature atmosphere especially in the axial direction of the metallic honeycomb body H' (in other words, the flowing direction of exhaust gas), separation takes place between an outermost peripheral wall of the metallic honeycomb body H' and an inner peripheral wall of the metallic casing C, so that the durability is significantly impaired.

This led to the need for a change to the belief that it is only necessary is to firmly fix the metallic honeycomb body H' and the metallic casing C together.

SUMMARY OF THE INVENTION

The present inventors have proceeded with an extensive investigation to overcome the above-described drawbacks.

As a result, it has been found that a metallic substrate excellent not only in durability but also in economy owing to the need for an expensive brazing material such as a film-shaped amorphous high-temperature brazing material in a smaller amount than conventional metallic substrates can be obtained by successively arranging three metallic honeycomb bodies instead of the conventional method of arranging a single elongated metallic honeycomb body within a metallic casing and further improving the fixing method for points of contact between members (a planar band and a corrugated band) of each metallic honeycomb body and also for points of contact between an outer peripheral wall of each metallic honeycomb body and an inner peripheral wall of a metallic casing.

The present invention has been completed based on the above finding and provides a metallic substrate excellent not only in economy but also in durability and exhaust gas cleaning ability.

In one aspect of the present invention, there is thus provided an exhaust gas cleaning metallic substrate of the structure that three metallic honeycomb bodies for supporting thereon an exhaust gas cleaning catalyst, each having a honeycomb structure composed of a planar band and a corrugated band made of metal sheets, are successively arranged in a flowing direction of exhaust gas within a metallic casing, characterized in that:

(i) among the three metallic honeycomb bodies arranged within the metallic casing, the metallic honeycomb bodies at front and rear positions have each been constructed by fixing the planar and corrugated bands as constituent members of said metallic honeycomb body at at least some of points of contact therebetween and also an outer peripheral wall of the metallic honeycomb body and an inner peripheral wall of the metallic casing at at least some of points of contact therebetween;

(ii) among the three metallic honeycomb bodies arranged within the metallic casing, the metallic honeycomb body at a middle position has been constructed without fixing the planar and corrugated bands as constituent members of said metallic honeycomb body at points of contact therebetween and also an outer peripheral wall of the metallic honeycomb body and an inner peripheral wall of the metallic casing at points of contact therebetween.

Owing to the above construction of the exhaust gas cleaning metallic substrate according to the present invention, the following advantageous effects (i)–(iii) have been brought about.

(i) The middle metallic honeycomb body out of the three metallic honeycomb bodies tends to develop thermal stress under severe thermal conditions and to undergo substantial deformation. Since the middle metallic honeycomb body itself is held in a non-fixed state within the metallic casing and is arranged between the front and rear metallic honeycomb bodies fixed by brazing or the like, the middle metallic honeycomb body is allowed to freely undergo deformation. The exhaust gas cleaning metallic substrate according to the present invention therefore has been improved in durability over the conventional fixed type.

(ii) In the middle metallic honeycomb body, its constituent members (i.e., the planar and corrugated bands) are not fixed together at points of contact therebetween unlike the constituent members of conventional metallic honeycomb bodies (in other words, are in a non-fixed state). It is therefore possible to have the exhaust gas cleaning catalyst supported to areas close to the respective points of contact. In other words, it is possible to increase the effective surface area of the catalyst-supporting constituent members than the conventional metallic honeycomb bodies. This has made it possible to reduce the size of the metallic substrate (i.e., to make the metallic substrate compact), to say nothing of to improve the purifying ability of exhaust gas.

In the conventional structure that constituent members are fixed together at each point of contact therebetween, a fillet is formed at each point of contact so that the effective area for supporting a catalyst is decreased.

(iii) When brazing is employed by way of example as a fixing method, an expensive Ni-base high-temperature brazing material such as a film-shaped amorphous brazing material is used. In the metallic substrate according to the present invention, the amount of such a brazing material can be substantially reduced. This has made it possible to avoid reductions in the heat resistance and strength of the bands which would otherwise take place based on alloying reactions between the components of the brazing material and the base material of the bands. In addition, because such an expensive brazing material is not used or fixing is performed at fewer areas in fixing work by welding or the like, the metallic substrate can be obtained economically.

DETAILED DESCRIPTION OF THE INVENTION AND PREFERRED EMBODIMENTS

The technical features and embodiments of the present invention will hereinafter be described in detail with reference to the accompanying drawings.

It is however be borne in mind that the present invention is not limited to or by the illustrated embodiments.

Figure 1:
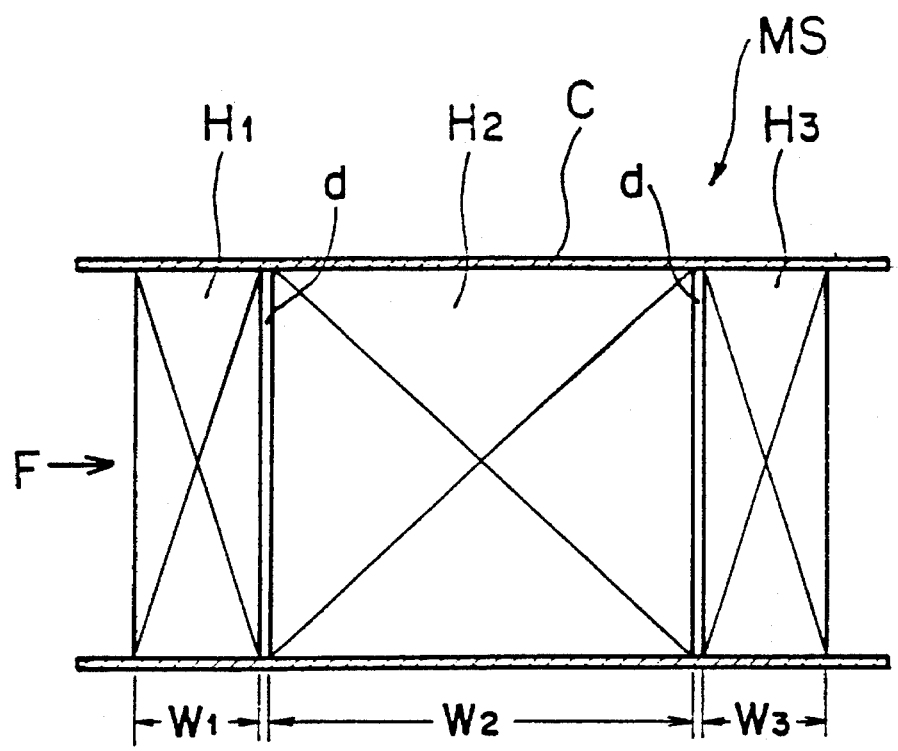
FIG. 1 is an axial cross-sectional view of a metallic substrate according to a first embodiment of the present invention, in which some parts have been omitted.
Figure 13:
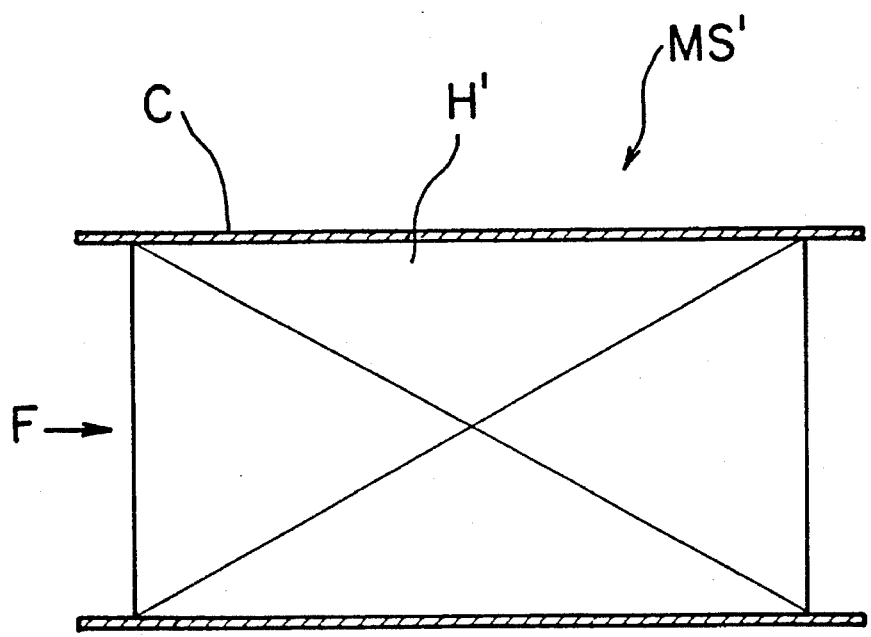
FIG. 13 is an axial cross-sectional view of a conventional metallic substrate, in which some parts have been omitted.

With reference to FIGS. 1 through 4, the metallic substrate MS according to the first embodiment of the present invention will now be described. FIG. 1 corresponds to FIG. 13 which illustrates the conventional technique.

As is shown in the drawings, the metallic substrate MS according to the first embodiment of the present invention is constructed of a metallic casing C, which constitutes an exhaust gas system, and three metallic honeycomb bodies $H_1, H_2, H_3$ successively arranged in a flowing direction F of exhaust gas within the metallic casing C.

A first feature of the metallic substrate MS according to the first embodiment of the present invention resides in that as described above, the three metallic honeycomb bodies $H_1, H_2, H_3$ are successively arranged in the flowing direction F of exhaust gas within the metallic casing C.

As the three metallic honeycomb bodies $H_1, H_2, H_3$, there are a variety of structures known for applications of this sort as described above. One of these structures or a combination of two or more of these structures can be used as desired.

Figure 2:
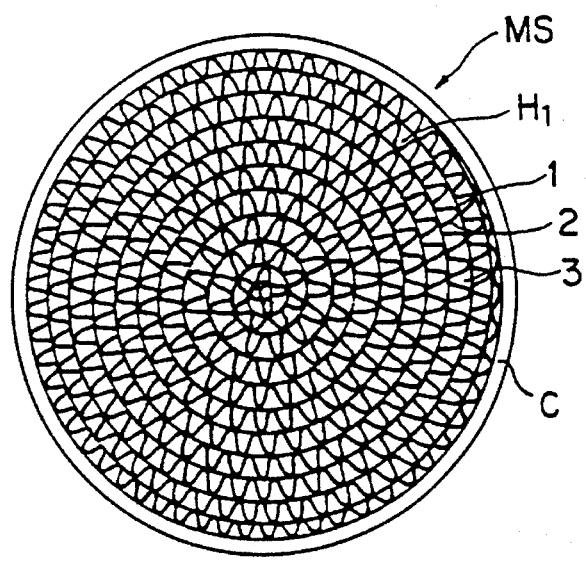
FIG. 2 is a front view of a metallic honeycomb body of the rolled type suitable for use in the metallic substrate according to the first embodiment of the present invention.

For example, the three metallic honeycomb bodies $H_1, H_2, H_3$ can each be formed into a rolled structure $H_1$ shown in FIG.2.

Figure 4A:
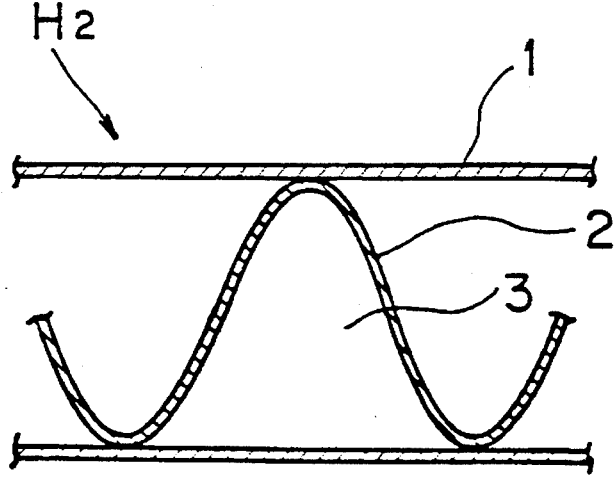
FIGS. 4A and 4B are enlarged fragmentary front views of middle metallic honeycomb bodies which are each suitable for use in the metallic substrate according to the first embodiment of the present invention.
Figure 4B:
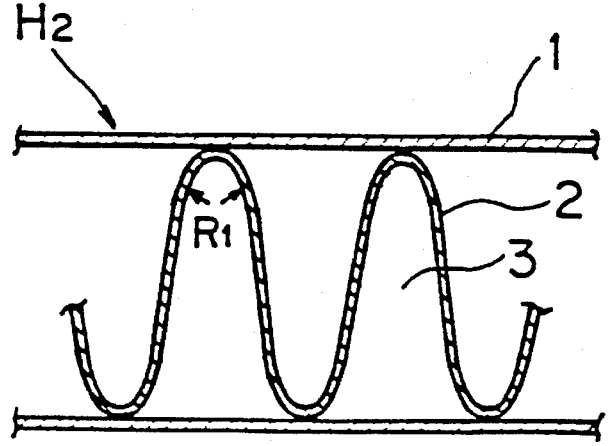

Further, as is illustrated in FIGS. 4A and 4B to be described subsequently herein, cells (network-patterned gas flow passages) of each metallic honeycomb body can be changed in size as desired. Incidentally, the middle metallic honeycomb bodies $H_2$ depicted in FIGS. 4A and 4B, respectively, have different cell shapes.

A second feature of the metallic carrier MS according to the first embodiment of the present invention resides in the fixing method for the three metallic honeycomb bodies $H_1, H_2, H_3$ which are arranged successively.

Described specifically, the fixing of the metallic honeycomb bodies $H_1, H_2, H_3$ in the metallic substrate MS according to the first embodiment of the present invention is conducted in the following manner.

Figure 3:
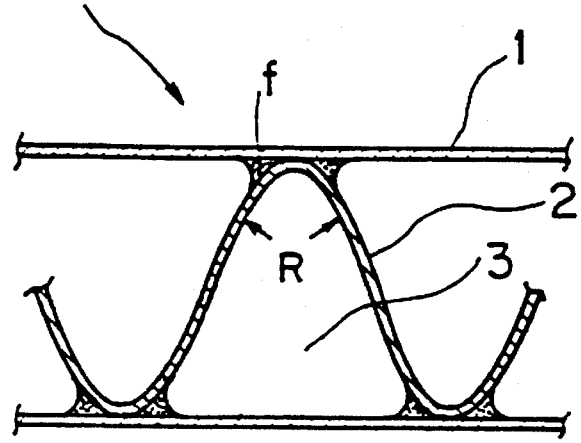
FIG. 3 is an enlarged fragmentary front view of a front or rear metallic honeycomb body suitable for use in the metallic substrate according to the first embodiment of the present invention.

(i) In each of the front and rear metallic honeycomb bodies $H_1, H_3$ out of the three metallic honeycomb bodies $H_1, H_2, H_3$, the planar band 1 and the corrugated band 2 as constituent members of the metallic honeycomb body are brazed at at least some of points of contact therebetween as illustrated in FIG. 3. Incidentally, FIG. 3 shows the embodiment that the planar band 1 and the corrugated band 2 are brazed together at all the points of contact therebetween. Although not illustrated in the drawing, outer peripheral walls of the metallic honeycomb bodies $H_1, H_3$ and an inner peripheral wall of the metallic casing C are also brazed at at least some of points of contact therebetween in the present invention.

(ii) Further, the middle metallic honeycomb body $H_2$ out of the three metallic honeycomb bodies $H_1, H_2, H_3$ is merely arranged between the front metallic honeycomb body $H_1$ and the rear metallic honeycomb body $H_3$ without fixing by brazing or the like the planar band 1 and the corrugated band 2, as constituent members of the middle metallic honeycomb body $H_2$, together at points of contact therebetween and the metallic honeycomb body $H_2$ and the metallic casing C at points of contact therebetween.

Owing to the above-described manners of arrangement and fixing of the three metallic honeycomb bodies $H_1, H_2, H_3$, the middle metallic honeycomb body $H_2$ can freely deform between the metallic honeycomb bodies $H_1, H_3$ fixed at the front and rear positions of the former metallic honeycomb body even when large thermal stress is produced inside the former metallic honeycomb body. The durability of the middle metallic honeycomb body $H_2$ has hence been improved.

Because the constituent members (i.e., the planar band and the corrugated bands) of the middle metallic honeycomb body $H_2$ are not fixed together at points of contact therebetween (in other words, are in a non-fixed state) unlike the conventional metallic honeycomb bodies, it is possible to have the exhaust gas cleaning catalyst supported even at areas close to the individual points of contact and hence to improve the cleaning ability. This also leads to a smaller (i.e., compact) metallic substrate MS.

Needless to say, when fixing is performed by adopting brazing as a fixing method for the points of contact, fillets (f) are formed at the points of contact so that the effective area for supporting the catalyst is reduced.

Brazing is not applied to the middle metallic honeycomb body $H_2$ in the present invention so that the effective area for supporting the catalyst can be increased.

In the above-described brazing, an expensive Ni-base high-temperature brazing materials such as a film-shaped amorphous brazing material is used. According to the fixing method of the present invention, only the front and rear metallic honeycomb bodies $H_1, H_3$ are brazed. This has made it possible to substantially save the brazing material and also to prevent a reduction in the heat-resistance of the bands due to alloying reactions between metal components of the brazing material and metal components of the bands.

As will be described subsequently herein, use of metallic honeycomb bodies having small widths $W_1, W_2$ as the front and rear metallic honeycomb bodies $H_1, H_3$ in the present invention, only these front and rear metallic honeycomb bodies $H_1, H_3$ can be brazed in large quantities in a vacuum furnace, thereby providing the brazing with high productivity and hence permitting fabrication of metallic substrates MS excellent in economy.

The above-described brazing method which makes use of the vacuum furnace is required to place metallic honeycomb bodies in the vacuum furnace of a limited internal space and to work as long as 10 hours including pre-procedures and post-procedures such as setting of prescribed vacuum conditions, setting of predetermined heating conditions and cooling. High productivity is therefore required for this brazing method.

Where the front and rear metallic honeycomb bodies H1,$H_3$ alone are brazed in large quantities in a vacuum furnace, it is possible to adopt the fabrication method that the above-described brazed metallic honeycomb bodies H1,$H_3$ and the non-brazed metallic honeycomb body $H_2$ are assembled in the metallic casing C and the metallic casing C and the front and rear metallic honeycomb bodies H1,$H_3$ are fixed together at points of contact therebetween, for example, by applying welding, crimping or the like from the outside of the metallic casing C.

According to the conventional brazing-dependent fabrication method of a metallic substrate, one or more metallic honeycomb bodies having large overall widths and assembled in a metallic casing C are arranged in a vacuum furnace and the metallic honeycomb bodies and the metallic casing are then brazed. The productivity of the brazing work is extremely low.

The metallic substrate MS according to the first embodiment of the present invention permits a variety of modifications as will be indicated hereinbelow. (1) The widths $W_1$–$W_3$ of the respective metallic honeycomb bodies $H_1$–$H_3$ shown in FIG. 1 can be set as desired.

Even if the bands 1,2 as constituent members in each of the front and rear metallic honeycomb bodies $H_1,H_3$ are fixed together by brazing or the like at all points of contact therebetween, setting of these widths $W_1,W_2$ at values substantially smaller than the width of the middle metallic honeycomb body $H_2$ makes it possible to reduce the thermal stress and hence to improve the durability. (2) The intervals d between the respective metallic honeycomb bodies $H_1$–$H_3$ shown in Table 1 can be set as desired. Depending on the widths $W_1$–$W_3$ of the individual metallic honeycomb bodies $H_1$–$H_3$, the metallic honeycomb bodies $H_1$–$H_3$ may be arranged in close contact with each other or in view of the quantity of deformation (telescoping) in the axial direction, may be arranged at desired intervals.

(3) As is illustrated in FIG. 3 and FIG. 4B, the cells 3 in the front and rear metallic honeycomb bodies $H_1,H_3$ and the in the middle metallic honeycomb body $H_2$ can have different sizes. For example, the size of the cells 3 in the middle metallic honeycomb body $H_2$ can be set smaller that those of the cells 3 in the other metallic honeycomb bodies $H_1,H_3$ so that the catalyst is supported in a greater quantity to complete a great majority of catalytic reactions (exhaust gas cleaning reactions) there.

More specifically, this can be done by changing the pitch of the corrugated band 2 or by making the radius of curvature (R) of top portions (ridge/grooves) of the corrugated band 2 smaller. Incidentally, FIG. 3 illustrates a corrugated band having a large radius of curvature (R) while FIG. 4B depicts a corrugated band having a small radius of curvature ($R_1$).

(4) In the present invention, the fixing method applied to the front and rear metallic honeycomb bodies $H_1,H_3$ is not limited to the above-described brazing method. Although not illustrated in the drawings, various welding methods such as laser welding, electron beam welding and electric welding can be adopted either singly or in combination.

(5) The fixing method applied to the front and rear metallic honeycomb structure $H_1,H_3$ can be practiced in various manners in the present invention.

Described specifically, upon fixing the constituent members (the planar member and the corrugated member) of the metallic honeycomb structure, they can be fixed together at all points of contact therebetween or in view of absorption and lessening of thermal stress, only at some of the points of contact. For example, each metallic honeycomb body can be fixed only at one end face portion or its vicinity area and the opposite end face portion thereof can be left in an non-connected state.

(6) The fixing between the metallic honeycomb bodies $H_1,H_3$ and the metallic casing C at the points of contact therebetween is not limited to the above-described brazing and can be conducted by welding or crimping. They can be fixed at all the points of contact therebetween or in view of absorption and lessening of thermal stress, can be fixed at only some of the points of contact therebetween.

As the planar bands 1 employed for the fabrication of the metallic honeycomb body $H_1,H_2,H_3$ in the present invention, bands employed upon fabrication of ordinary metallic monolithic honeycomb bodies, for example, bands having a thickness of about 40 μm to 100 μm and made of chromium steel (13–25% chromium), heat-resisting stainless steel such as Fe-20%Cr-5%Al or heat-resisting stainless steel with rare earth metals (REMs) added to such chromium steel or stainless steel to improve its high-temperature oxidation resistance. As the corrugated bands 2, it is possible to use those obtained by corrugating the above-described planar bands 1 so that the resulting corrugated bands have a predetermined substantially sinusoidal or trapezoidal wave. The planar bands 1 and the corrugated bands 2 can be different in thickness from each other and can be made of different materials.

Particularly preferred as the first and second corrugated bands 1,2 are those containing Al or those carrying a layer of alumina ($Al_2O_3$) in a whisker or mushroom form deposited on their surfaces by heat-treatment of steel bands having an Al layer formed on their surfaces. An alumina layer in a whisker form or the like is desired because it can firmly hold a wash-coat layer on which an exhaust gas cleaning catalyst formed of Pt, Pd, Rh and the like is supported.

In the present invention, the metallic honeycomb bodies $H_1,H_2,h_3$ are inserted in the metallic casing C and are then fixed there. No particular limitation is therefore imposed on the metallic casing C insofar as it is open at opposite ends and has the same cross-sectional shape as that of the cross-sectional shapes of the metallic honeycomb bodies $H_1,H2,h_3$.

Namely, the metallic casing C can have a shape conforming with the shapes of the metallic honeycomb bodies $H_1,H_2,H_3$ as viewed in front view (or cross-section). Its shape is therefore not limited to a circular shape but can be in a racetrack shape, an oval shape, a polygonal shape or another shape.

As the material of the above-described metallic casing C, it is possible to use a heat-resistant steel of the same type as that of the bands 1,2 making up the metallic honeycomb bodies $H_1,H_2,H_3$. As an alternative, a material of a double-layer structure having high heat and corrosion resistance, specifically, a metallic casing making use of a ferritic stainless steel for the inner side and an austenic steel for the outer side can also be used.

Figure 5:
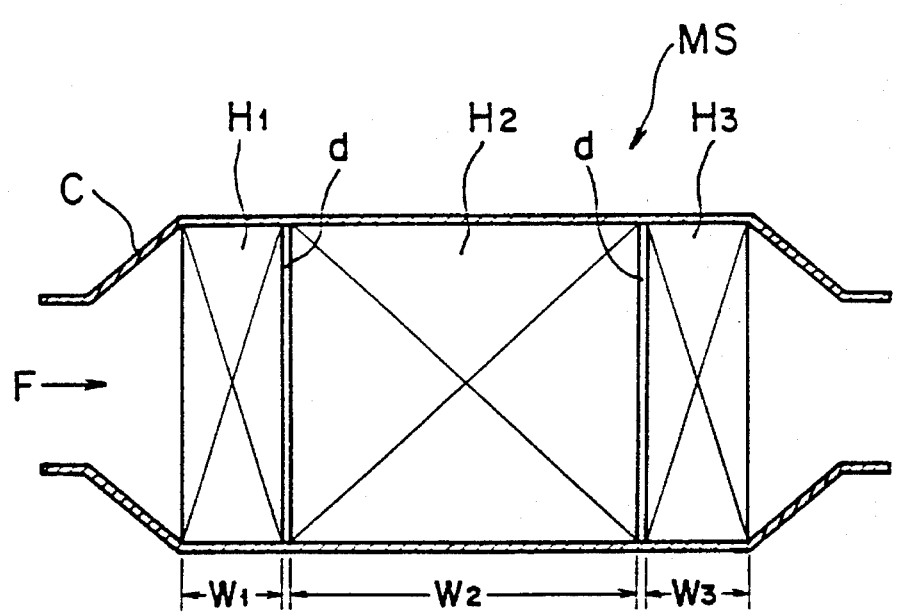
FIG. 5 is an axial cross-sectional view of a metallic substrate according to a second embodiment of the present invention, in which some parts have been omitted.

Referring next to FIG. 5, the metallic substrate (MS) according to the second embodiment o the present invention will be described.

Figure 10:
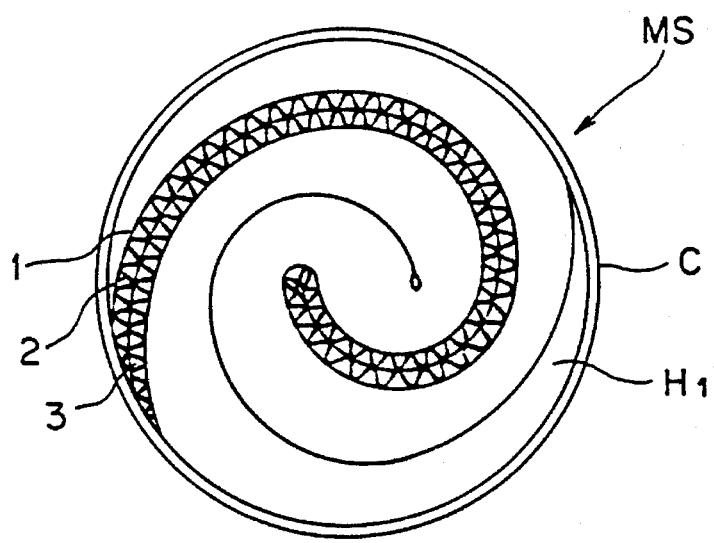
FIG. 10 is a front view of a metallic honeycomb body (of the S-shaped type) according to a fourth modification, which is suitable for use in a metallic substrate according to the present invention.

The metallic casing MS according to the second embodiment of the present invention is substantially the same as the metallic substrate MS according to the first embodiment of the present invention, except that the metallic casing C in the second embodiment has a shape different from that in the first embodiment (namely, has a cone-shaped exhaust gas inlet portion and outlet portion) and the metallic honeycomb bodies $H_1,H_2,H_3$ in the second embodiment are structurally different from those in the first embodiment. Namely, in the metallic substrate MS according to the second embodiment, the front and rear metallic honeycomb bodies $H_1,H_3$ are formed of rolled metallic honeycomb bodies as in the first embodiment (FIG. 2) and the middle metallic honeycomb body $H_2$ is formed of an S-shaped metallic honeycomb body to be described subsequently herein (FIG. 10).

In the metallic substrate MS according to the second embodiment of the present invention, a variety of modifications are feasible with respect to the construction of the middle metallic honeycomb body $H_2$. Namely, as the middle metallic honeycomb body $H_2$, those known in the present field of art as metallic honeycomb bodies for supporting an exhaust gas cleaning catalyst can be chosen as desired for use in combination with the front and rear metallic honeycomb bodies $H_1,H_3$.

Figure 8:
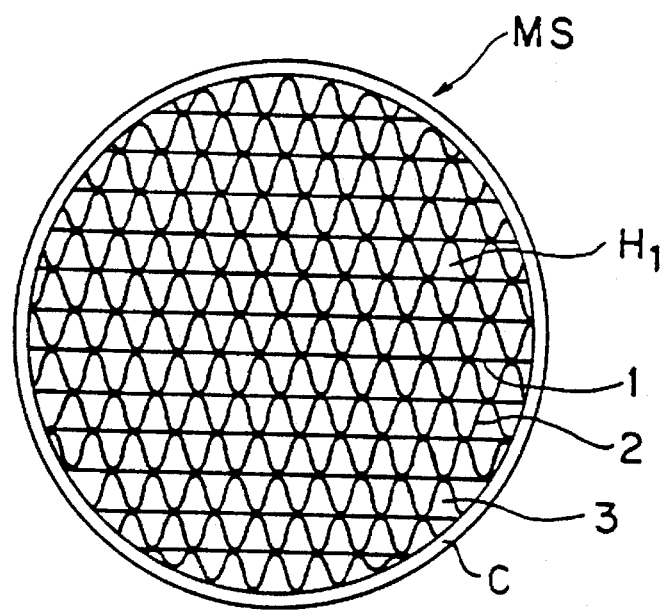
FIG. 8 is a front view of a metallic honeycomb body (of the stacked type) according to a second modification, which is suitable for use in a metallic substrate according to the present invention.
Figure 9:
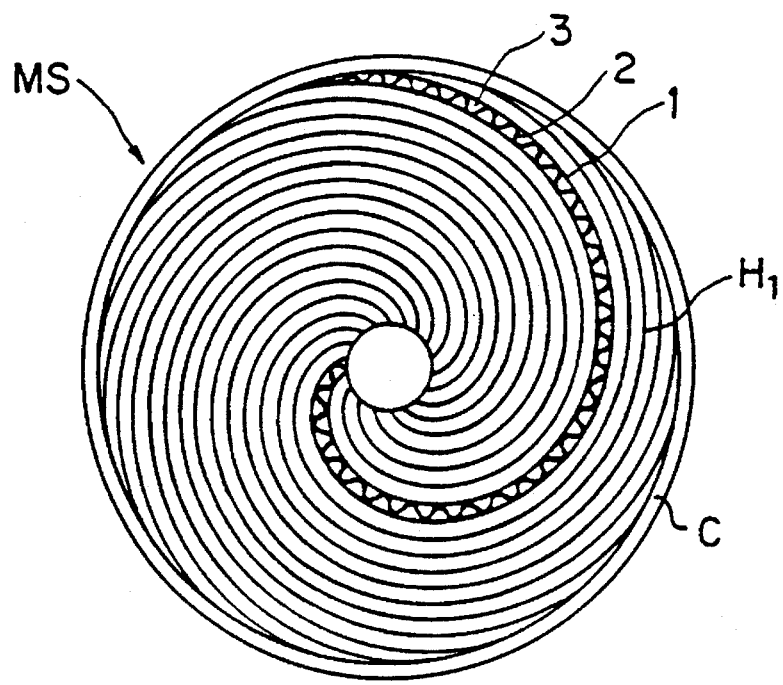
FIG. 9 is a front view of a metallic honeycomb body (of the radial type) according to a third modification, which is suitable for use in a metallic substrate according to the present invention.
Figure 11:
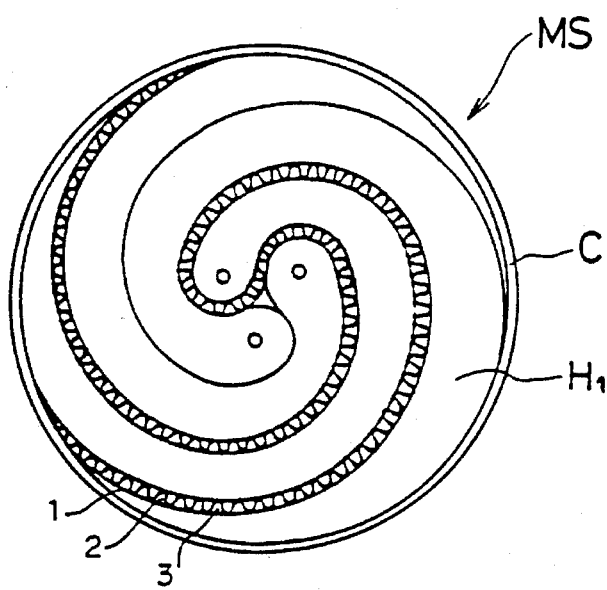
FIG. 11 is a front view of a metallic honeycomb body (of the type that three huge commas are so united as to make a perfect circle) according to a fifth modification, which is suitable for use in a metallic substrate according to the present invention.
Figure 12:
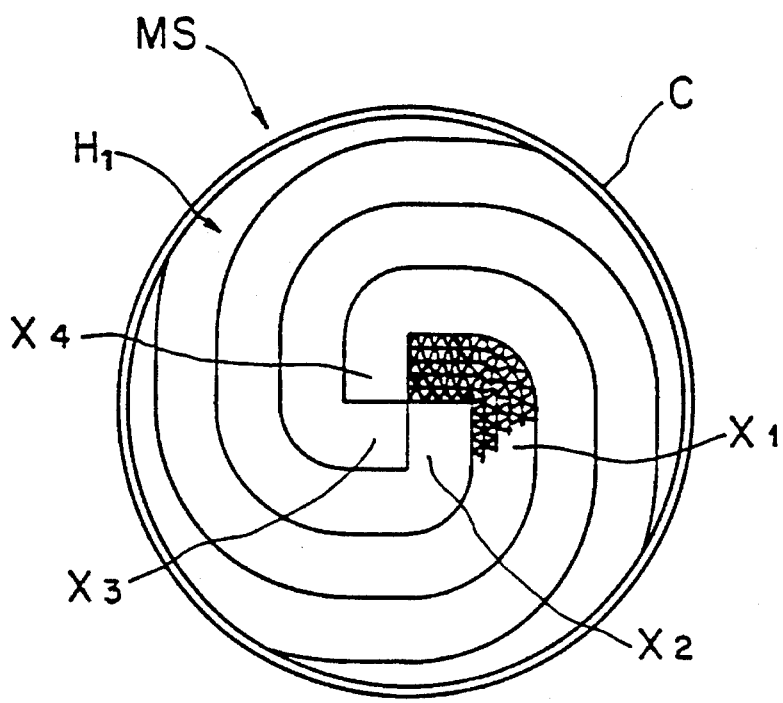
FIG. 12 is a front view of a metallic honeycomb body (of the X-wrapped, i.e., swastika-patterned type) according to a sixth modification, which is suitable for use in a metallic substrate according to the present invention.

Known as metallic honeycomb bodies $H_2$ of this type include, in addition to the above-described S-shape type (FIG. 10), the stacked (layered) type (FIG. 8), the radial type (FIG. 9), the type that three huge commas are so united as to make a perfect circle (FIG. 11), and the X-wrapped type (FIG. 12).

In association with metallic honeycomb bodies of the above-described various structures, a variety of modifications are feasible with respect to the metallic substrates MS according to the first and second embodiments. In each of the first and second embodiments, the three metallic honeycomb bodies $H_1,H_2,H_3$ to be employed can be formed by suitably choosing and combining the above-described metallic honeycomb bodies of the various structures.

In the metallic honeycomb bodies of various structures which make up the above-described three metallic honeycomb bodies $H_1,H_2,H_3$, the metallic honeycomb body $H_1$ of the S-shaped type or the type that three huge commas are so united as to make a perfect circle shown in FIG. 10 or FIG. 11, said metallic honeycomb body $H_1$ making up, for example, the front metallic honeycomb body, can be fabricated as will be described hereinbelow.

The metallic honeycomb body $H_1$ of the S-shaped type or the type that three huge commas are so united as to make a perfect circle has a structure obtained by using a desired number of stacks, each having been formed by alternately stacking planar bands 1 and corrugated bands 2 made of metal sheets to a desired number of stages, arranging a winding jig on a surface of a substantially central part of the respective stacks, rolling and forming the stacks in the same direction around the rolling jig and maintaining opposite end portions of the individual planar bands 1 and the corrugated bands 2 in each stack in contact with an inner peripheral wall of a metallic casing in which the stacks are enclosed.

In the above-described fabrication method, use of a single stack results in the provision of an S-shaped metallic honeycomb body $H_1$ in which the constituent members are curved in the S shape at the central part as illustrated in FIG. 10, while use of three stacks leads to the provision of a metallic honeycomb body $H_1$ of the type that three huge commas are so united as to make a perfect circle in which the three stacks are arranged at the central part in the form of three huge commas so united as to make a perfect circle as shown in FIG. 11.

Further, the metallic honeycomb body $H_1$ of the X-wrapped type is of a structure obtained by alternately stacking planar bands 1 and corrugated bands 2 made of metal sheets to a desired number of stages, using four stacks $X_1-X_4$ formed as described immediately above, mutually bringing the individual stacks into contact with each other at one ends thereof, that is, at contacting end portions thereof, rolling the stacks in the same direction around the contacting end portions and then bringing the individual planar band 1 and the corrugated bands 2 of the individual stacks into contact with an inner peripheral wall of the metallic casing which externally encloses the four stacks. In the fabrication method described above, the four stacks are in an X-wrapped (swastika-patterned) form at a central part as depicted in FIG. 12 so that the metallic honeycomb body $H_1$ generally called an "X-wrapped type" is obtained.

Figure 6:
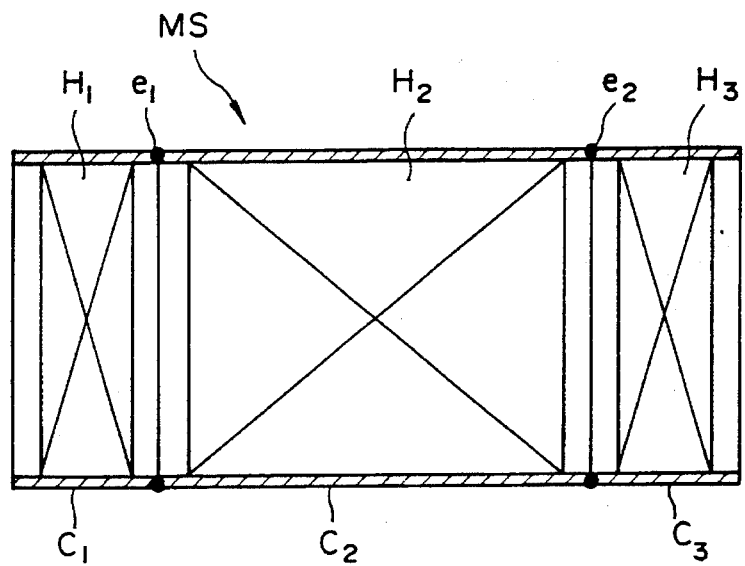
FIG. 6 is an axial cross-sectional view of a metallic substrate according to a third embodiment of the present invention, in which some parts have been omitted.
Figure 7:
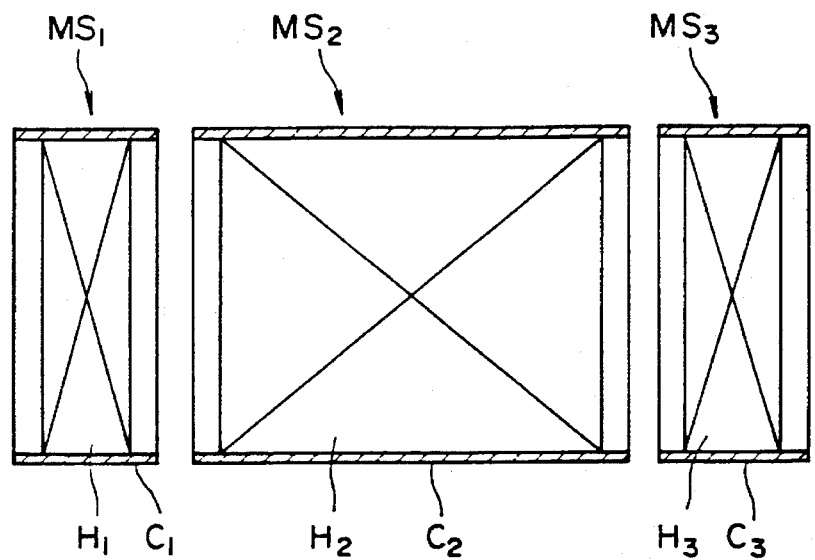
FIG. 7 is an axial cross-sectional view of three metallic substrate members forming the metallic substrate according to the third embodiment of the present invention.

FIG. 6 to FIG. 7 are drawings for describing the metallic substrate MS according to the third embodiment of the present invention.

FIG. 7 shows three members which make up the metallic substrate MS according to the third embodiment. As in FIG. 6, each member in FIG. 7 is shown in an axial cross-section.

The metallic substrate MS according to the third embodiment has been constructed by using the three members shown in FIG. 7, namely, the three metallic substrate members $MS_1,MS_2,MS_3$ and welding the individual metallic substrate members at end portions thereof which are in contact with the metallic casing.

Incidentally, welded portions are shown by $e_1,e_2$ in FIG. 6.

The three metallic substrate members $MS_1-MS_3$ are constructed in the following manner by using three casing members $C_1-C_3$ and three metallic honeycomb bodies $H_1-H_3$.

(1) The first metallic substrate member $MS_1$ is constructed of the metallic casing member $C_1$ and the front metallic honeycomb body $H_1$ fixed inside the metallic casing member $C_1$. Incidentally, the constituent members (planar band and corrugated band) of the metallic honeycomb body $H_1$ are fixedly brazed together at points of contact therebetween, and the metallic honeycomb body $H_1$ and the metallic casing $C_1$ are fixedly brazed together at points of contact therebetween.

(2) The second metallic substrate member $MS_2$ is constructed of the metallic casing member $C_2$ and the middle metallic honeycomb body $H_2$ arranged inside the metallic casing member $C_2$.

(3) The third metallic substrate member $MS_3$ is constructed, like the first metallic substrate member $MS_1$, of the metallic casing member $C_3$ and the rear metallic honeycomb body $H_3$ fixed inside the metallic casing member $C_3$.

As has been described above, the first metallic substrate member $MS_1$ and the third metallic substrate member $MS_3$ are constructed by arranging the front and rear metallic honeycomb bodies $H_1,H_3$ inside the casing members $C_1,C_3$ and then fixing the constituent members of the metallic honeycomb bodies at points of contact therebetween and the metallic honeycomb bodies and the corresponding casing members at points of contact therebetween by brazing.

Since the above-described brazing of the individual elements at the points of contact therebetween can be simultaneously conducted using the vacuum furnace described above in connection with the first embodiment, its productivity is overwhelmingly higher compared with those available from the conventional methods. The use of such a vacuum furnace is feasible because as illustrated in the drawings, the first metallic substrate member $MS_1$ and the third metallic substrate member $MS_3$ are formed thin and a large number of first metallic substrate members and third metallic substrate members can therefore be treated in the vacuum furnace of the limited space.

With respect to the metallic substrate MS according to the third embodiment of the present invention, various modifications are feasible.

For example, one of various fixing methods can obviously be applied in place of the brazing method applied to the first member $MS_1$ and the third member $MS_3$. Further, the fixing can be conducted at desired points of contact.

What is claimed is:

1. An exhaust gas cleaning metallic substrate of the structure comprising three separate metallic honeycomb bodies for supporting thereon an exhaust gas cleaning catalyst, each of the metallic honeycomb bodies having a honeycomb structure composed of a planar band and a corrugated band made of metal sheets, and being sequentially arranged in a flowing direction of exhaust gas within a metallic casing so that the three metallic honeycomb bodies occupy front, middle and rear positions, respectively, wherein:

(i) the metallic honeycomb bodies at front and rear positions have a construction whereby at least some of the points of contact between the planar and corrugated bands of each of the front and rear position metallic honeycomb bodies are fixed together and at least some of points of contact between an outer peripheral wall of each of the front and rear position metallic honeycomb bodies and an inner peripheral wall of the metallic casing are fixed together; and (ii) wherein the metallic honeycomb body at the middle position has a construction whereby the planar and corrugated bands of said middle position metallic honeycomb body are not fixed together and an outer peripheral wall of the metallic honeycomb body and an inner peripheral wall of the metallic casing are not fixed together.

2. An exhaust gas cleaning metallic substrate according to claim 1, wherein the metallic casing comprises first metallic substrate comprises:

(i) a first metallic substrate member comprising the first metallic casing member and the front position metallic honeycomb body arranged in the first metallic casing member, (ii) a second metallic substrate member comprising the second metallic casing member and the middle position metallic honeycomb body arranged in the second metallic casing member, and (iii) a third metallic substrate member comprising the third metallic casing member and the rear position metallic honeycomb body arranged in the third metallic casing member.

3. An exhaust gas cleaning metallic substrate according to claim 2, wherein at least some of points of contact between the front position metallic honeycomb body and the first metallic casing member and between the rear position metallic honeycomb body and the third metallic casing member are fixed together and, further, the second metallic casing and the middle metallic honeycomb body are not fixed together.

4. An exhaust gas cleaning metallic substrate according to claim 3, wherein the fixing has been effected by brazing.

5. An exhaust gas cleaning metallic substrate according to claim 2, wherein the first, second and third metallic casing members of the first, second and third metallic substrate members have been fixed together by welding them at areas of contact therebetween.

6. An exhaust gas cleaning metallic substrate according to claim 1, wherein each the three metallic honeycomb bodies have one of a rolled type, a stacked type, a radial type, an S-shaped type and an X-wrapped type structure.

7. An exhaust gas cleaning metallic substrate according to claim 6 wherein each of the three metallic honeycomb bodies have the same structure.

8. An exhaust gas cleaning metallic substrate according to claim 6 wherein the three metallic honeycomb bodies are different in structure from each other.

9. An exhaust gas cleaning metallic substrate according to claim 1, wherein the middle position metallic honeycomb body has a width greater than the widths of the front and rear position metallic honeycomb bodies.

10. An exhaust gas cleaning metallic substrate according to claim 1, wherein the three metallic honeycomb bodies are apart from each other.

11. An exhaust gas cleaning metallic substrate according to claim 1, wherein the three metallic honeycomb bodies are in abutting contact with each other.

* * * * *